Jan. 28, 1930. C. F. YOCUM 1,744,853
BUCKET CLEANER FOR TRENCHING MACHINES
Filed Sept. 28, 1927
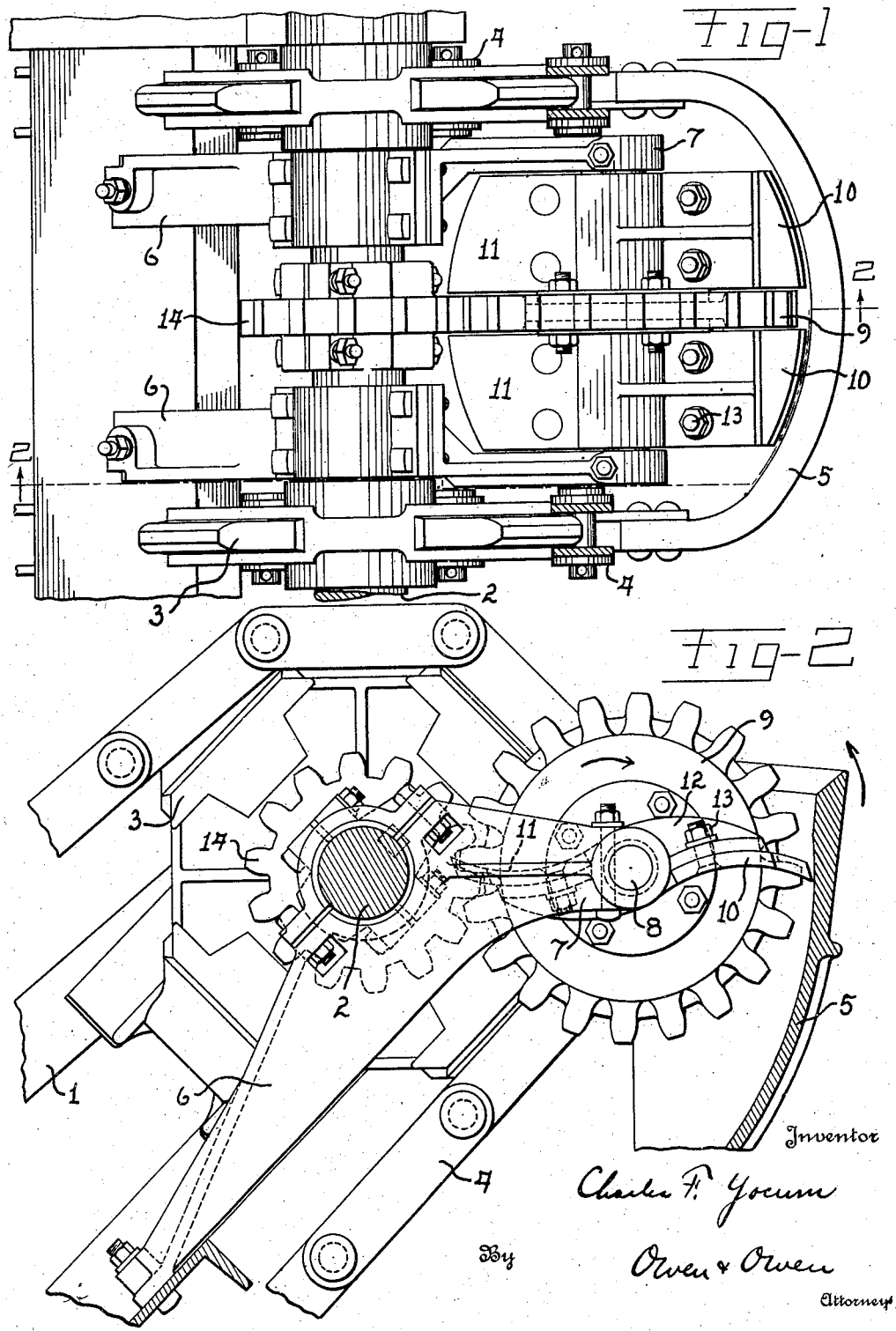

Patented Jan. 28, 1930

1,744,853

UNITED STATES PATENT OFFICE

CHARLES F. YOCUM, OF FINDLAY, OHIO, ASSIGNOR TO THE BUCKEYE TRACTION DITCHER COMPANY, OF FINDLAY, OHIO, A CORPORATION OF OHIO

BUCKET CLEANER FOR TRENCHING MACHINES

Application filed September 28, 1927. Serial No. 222,436.

This invention relates to trenching machines of that type employing an endless series of digging and conveying buckets, but more particularly to cleaning devices for the buckets to enable the latter to be automatically cleaned during their travel.

Objects of this invention are to provide a cleaning or scraping means for an endless series of buckets which is positive in action, will free itself of material automatically, has perfect uniformity of performance and by which the cumulation of material around the excavator drive shaft is prevented. Other objects and advantages of the invention will hereinafter appear.

In one embodiment of the invention the cleaning element for the buckets consists of a rotary scraper having two blades and revolving in the direction opposite to the travel of the buckets. The cleaner may be driven by a pair of dirt-proof gears so timed that each alternate blade strikes each alternate bucket at the same point. By this arrangement it has been found possible to secure efficient and thorough cleaning of the buckets with practically no trouble or inspection.

The invention is shown by way of illustration in the accompanying drawings, in which:

Fig. 1 is a top plan view of the upper portion of a trenching machine with the sprocket chains thereof removed; and Fig. 2 is a side elevation partly in section of the machine shown in Fig. 1 and with the chains in place.

The illustrated embodiment of the invention comprises a swinging digging beam 1 of the usual type, and at the outer end of the beam is journaled a shaft 2, which carries sprocket wheels 3 at opposite ends thereof. Trained over the sprockets 3 are endless chains 4 to which rear-end-discharge digging and conveying buckets 5 are connected at suitably spaced intervals. It is to be understood that the buckets 5 are connected to the endless chains 4; that they dig into the material during the beginning of the upward movement thereof, and as they travel upwardly, assume such position that the material will not be discharged until they reach the upper end portion of the beam 1, when the rear ends are tilted away, thereby discharging the load.

Connected to the beam 1 at opposite sides thereof are brackets 6 providing bearings for the shaft 2 and having outwardly extending portions 7 at their upper ends to receive and support a shaft 8, upon which is centrally mounted a relatively large gear 9 on each side of which is disposed a pair of diametrically opposed cleaning blades 10 and 11. As shown in Fig. 2, the blade 10 is arcuately shaped curving downwardly at the outer end while the blade 11 is curved in the opposite direction. Each blade is secured to a mounting and bearing member 12 by bolts and nuts 13.

The outer ends of the blades 10 and 11 are curved to conform to the shape of the buckets, and the cleaning element is so positioned that the buckets will pass therethrough while passing upwardly around the sprocket wheels 3 so that all the material is removed from each bucket before passing above the level of the shafts 2 and 8.

The gear 9 is driven by a smaller gear 14 with which it meshes, the gear 14 being fixed to the shaft 2 for rotation therewith. The relative size of the gears 14 and 9 is such that the cleaning blades are rotated at such rate of speed that one pair of blades, such as blades 10, engage one bucket and the next succeeding bucket is engaged by the blades 11. To prevent the accumulation of dirt in the gears 9 and 14, relatively large gear teeth are provided.

It will be apparent that the rotary cleaning element is rotated in a direction opposite to the travel of the buckets 5 so that most efficient scraping is secured. The above described scraper or cleaner is positive in its action and can be relied upon to accomplish the desired result.

While I have shown and described one embodiment of my invention, it is to be understood that numerous changes may be made in details of construction, arrangement and operation without departing from the spirit of my invention, especially as defined in the appended claims.

What I claim as new and desire to secure by Letters Patent is:

1. In a trenching machine having an endless series of digging and conveying buckets, a rotary cleaner element for passing through said buckets, and means disposed within the confines of said buckets to rotate said cleaner element in a direction opposite to the travel of said buckets.

2. In a trenching machine, a beam, a sprocket wheel on said beam, an endless chain for said sprocket wheel having an endless series of buckets, a rotary cleaning element adjacent said sprocket wheel for passing through said buckets, and means disposed within the lateral confines of said buckets to rotate said cleaning blade in a direction opposite to the direction of travel of said buckets.

3. In a trenching machine, the combination of a chain having endless series of digging and conveying buckets, a sprocket wheel for said chain, a shaft for said sprocket wheel, a rotary cleaning element for passing through said buckets, and means driven from the sprocket shaft for rotating said cleaning element in a direction opposite to the travel of said buckets.

4. In a trenching machine, the combination of a swinging digging beam, a chain having an endless series of rear-end-discharge digging and conveying buckets on said beam, a rotary cleaner supported on the upper end portion of the beam to pass through the buckets, and means to rotate said cleaner in a direction opposite to the direction of travel of said buckets.

5. A trenching machine comprising a swinging digging beam, a sprocket chain having an endless series of rear-end-discharge digging and conveying buckets on said beam, a rotary cleaner member supported on the upper end portion of the beam to pass through the buckets, said cleaner member having a pair of oppositely disposed blades, and means to rotate said cleaner in a direction opposite to the direction of travel of said buckets at such a rate that one blade cleans one bucket and the opposite blade cleans the next succeeding bucket.

6. A trenching machine comprising a swinging digging beam, bracket means on said beam, a sprocket shaft journaled in said bracket means, sprocket wheels in spaced relation on said shaft, chain means trained around said sprocket wheels and having an endless series of digging and conveying buckets, a cleaner member rotatable on an axis parallel to the axis of said sprocket shaft and having oppositely disposed sets of blades for passing through the buckets when at a load discharging point, and means conjoined to said sprocket shaft and disposed within the lateral confines of said buckets to rotate said cleaner member in a direction opposite to the direction of travel of said buckets.

7. A trenching machine comprising a swinging digging beam, bracket means on said beam, a sprocket shaft journaled in said bracket means, sprocket wheels in spaced relation on said shaft, chain means trained around said sprocket wheels and having an endless series of digging and conveying buckets, a rotary scraper supported to pass through said buckets and having oppositely disposed sets of blades, and means disposed within the lateral confines of said buckets to rotate said scraper so that one set of blades engages one bucket and the next set of blades engages the next succeeding bucket.

8. In a trenching machine, the combination of an endless series of digging and conveying buckets, rotary supporting means for one end portion of said series, a rotary cleaning element within the confines of said buckets, and means operatively conjoined to said rotary supporting means for driving said cleaning element in a direction opposite to the travel of said buckets.

In testimony whereof I have hereunto signed my name to this specification.

CHARLES F. YOCUM.